(12) United States Patent
Kiyono et al.

(10) Patent No.: US 8,486,179 B2
(45) Date of Patent: Jul. 16, 2013

(54) METHOD FOR PRODUCING CARBON MOLECULAR SIEVE MEMBRANES IN CONTROLLED ATMOSPHERES

(75) Inventors: Mayumi Kiyono, Atlanta, GA (US); Paul Jason Williams, Richmond, TX (US); William John Koros, Atlanta, GA (US)

(73) Assignees: Georgia Tech Research Corporation, Atlanta, GA (US); Shell Oil Company, Houston, TX (US)

( * ) Notice: Subject to any disclaimer, the term of this patent is extended or adjusted under 35 U.S.C. 154(b) by 332 days.

(21) Appl. No.: 12/817,910

(22) Filed: Jun. 17, 2010

(65) Prior Publication Data
US 2011/0100211 A1    May 5, 2011

Related U.S. Application Data

(60) Provisional application No. 61/256,097, filed on Oct. 29, 2009.

(51) Int. Cl.
B01D 53/22 (2006.01)
B01D 69/08 (2006.01)
C01B 31/02 (2006.01)

(52) U.S. Cl.
USPC ........... 95/51; 95/45; 96/4; 96/7; 96/8; 96/11; 423/447.7

(58) Field of Classification Search
USPC ........ 95/45, 51; 96/4, 7, 8, 10, 11; 423/447.1, 423/447.7
See application file for complete search history.

(56) References Cited

U.S. PATENT DOCUMENTS

| | | | | | |
|---|---|---|---|---|---|
| 4,640,901 | A | * | 2/1987 | Lee et al. | 96/12 |
| 5,925,420 | A | * | 7/1999 | Lee | 427/493 |
| 5,972,079 | A | * | 10/1999 | Foley et al. | 96/11 |
| 6,299,669 | B1 | * | 10/2001 | Koros et al. | 95/51 |
| 6,730,364 | B2 | * | 5/2004 | Hong et al. | 96/11 |
| 2002/0153315 | A1 | | 10/2002 | Koros et al. | |
| 2005/0235825 | A1 | | 10/2005 | Tin | |
| 2012/0079944 | A1 | * | 4/2012 | Vo et al. | 96/11 |

OTHER PUBLICATIONS

Geiszler, Vincent C. et al.; "Effects of Polyimide Pyrolysis Conditions on Carbon Molecular Sieve Membrane Properties"; 1996; Ind. Eng. Chem. Res.; vol. 35, pp. 2999-3003.*
Patent Cooperation Treaty, Notification Concerning Transmittal of International Preliminary Report on Patentability (Chapter I of the Patent Cooperation Treaty) (PCT Rule 44bis.1(c)), in International application No. PCT/US2010/047309, dated May 1, 2012.
PCT International Searching Authority, Notification of Transmittal of International Search Report and the Written Opinion, in PCT/US10/47309, dated Oct. 14, 2010.
Kiyono et al., Effect of Pyrolysis Atmosphere on Separation Performance of Carbon Molecular Sieve Membranes, Journal of Membrane Science, Oct. 21, 2009, vol. 359, pp. 2-10, p. 6, col. 2, para. 5; p. 7, table 4; p. 8, col. 1, para. 1; p. 8, figure 7; p. 8, col. 2, para. 1; p. 8, figure 8; p. 9, col. 1, para. 3.

* cited by examiner

*Primary Examiner* — Jason M Greene
(74) *Attorney, Agent, or Firm* — McAndrews, Held & Malloy, Ltd.

(57) ABSTRACT

The invention concerns carbon molecular sieve membranes ("CMS membranes"), and more particularly the use of such membranes in gas separation. In particular, the present disclosure concerns an advantageous method for producing CMS membranes with desired selectivity and permeability properties. By controlling and selecting the oxygen concentration in the pyrolysis atmosphere used to produce CMS membranes, membrane selectivity and permeability can be adjusted. Additionally, oxygen concentration can be used in conjunction with pyrolysis temperature to further produce tuned or optimized CMS membranes.

36 Claims, 7 Drawing Sheets

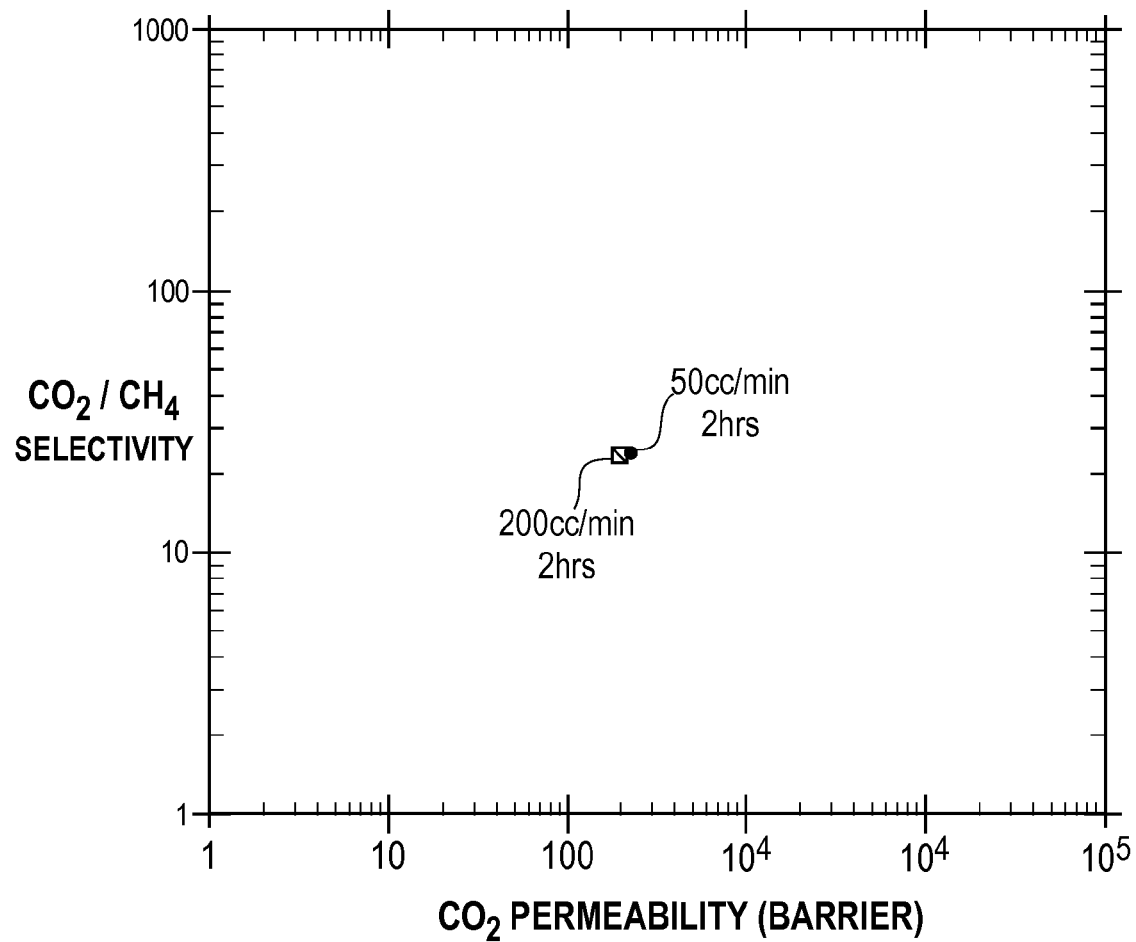

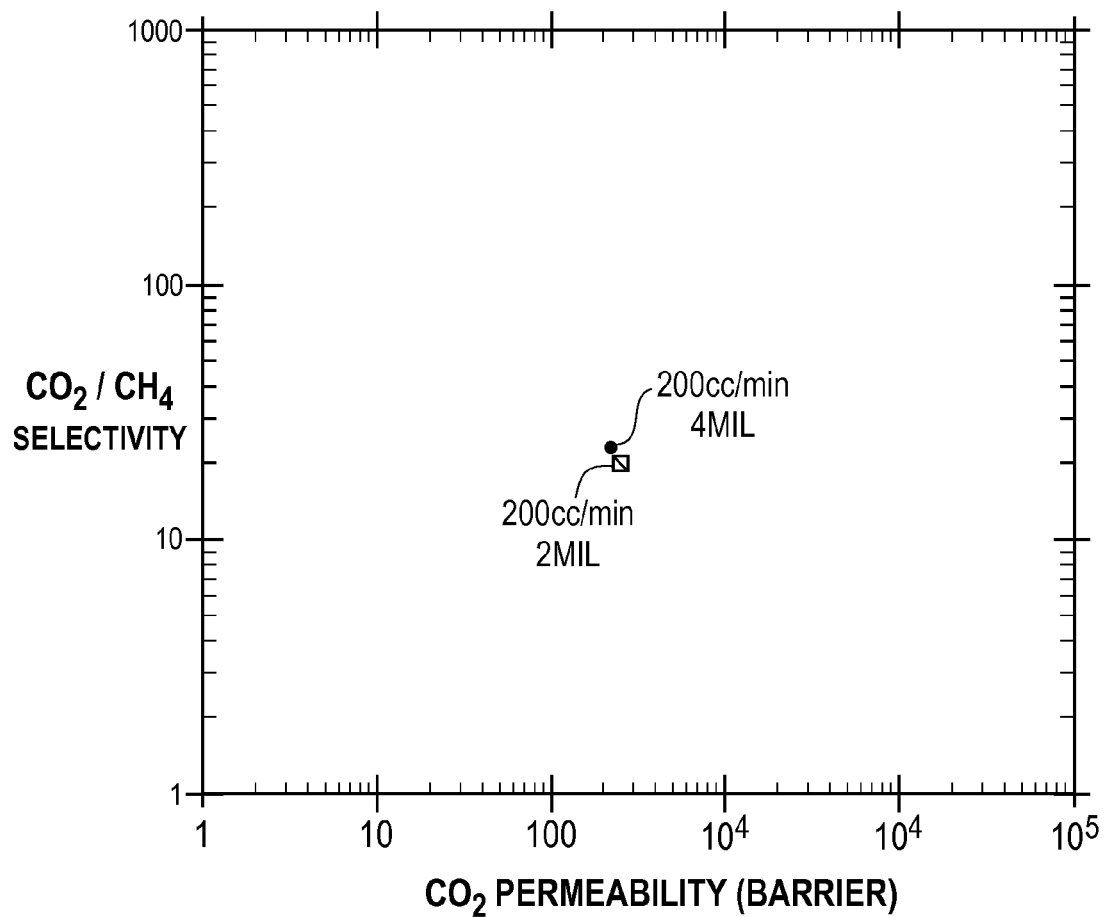

METHOD FOR PRODUCING CARBON MOLECULAR SIEVE MEMBRANES IN CONTROLLED ATMOSPHERES

CROSS REFERENCE TO RELATED APPLICATIONS

This application claims priority to provisional application No. 61/256,097 filed Oct. 29, 2009, the entire content of which is hereby incorporated by reference.

BACKGROUND OF THE INVENTION

The invention concerns carbon molecular sieve membranes ("CMS membranes"), and more particularly the use of such membranes in gas separation. In particular, the present disclosure concerns an advantageous method for producing CMS membranes with desired selectivity and permeability properties. It has been discovered that by controlling and selecting the oxygen concentration in the pyrolysis atmosphere used to produce CMS membranes, membrane selectivity and permeability can be adjusted. In particular, embodiments of the invention include optimizing acid gas permeability or selectivity by varying the oxygen concentration in the pyrolysis atmosphere. Further embodiments of the invention include using a combination of oxygen concentration and pyrolysis temperature to tune CMS performance.

Membranes are widely used for the separation of gases and liquids, including for example, separating acid gases, such as $CO_2$ and $H_2S$ from natural gas, and the removal of $O_2$ from air. Gas transport through such membranes is commonly modeled by the sorption-diffusion mechanism. Specifically, gas molecules sorb into the membrane at the upstream, diffuse through the membrane, and finally desorb from the membrane at the downstream. Two intrinsic properties are commonly used to evaluate the performance of a membrane material; "permeability" and "selectivity." Permeability is hereby defined as a measure of the intrinsic productivity of a membrane material; more specifically, it is the partial pressure and thickness normalized flux, typically measured in Barrer. Selectivity, meanwhile, is a measure of the ability of one gas to permeate through the membrane versus a different gas; for example, the permeability of $CO_2$ versus $CH_4$, measured as a unit-less ratio.

Currently, polymeric membranes are well studied and widely available for gaseous separations due to easy processability and low cost. CMS membranes, however, have been shown to have attractive separation performance properties exceeding that of polymeric membranes.

CMS membranes are typically produced through thermal pyrolysis of polymer precursors. For example, it is known that defect-free hollow fiber CMS membranes can be produced by pyrolyzing cellulose hollow fibers (J. E. Koresh and A. Soffer, Molecular sieve permselective membrane. Part I. Presentation of a new device for gas mixture separation. *Separation Science and Technology*, 18, 8 (1983)). In addition, many other polymers have been used to produce CMS membranes in fiber and dense film form, among which polyimides have been favored. Polyimides have a high glass transition temperature, are easy to process, and have one of the highest separation performance properties among other polymeric membranes, even prior to pyrolysis.

U.S. Pat. No. 6,565,631 to Koros et al., which is incorporated herein by reference, describes a method of synthesizing CMS membranes. In particular, a polyimide hollow fiber was placed in a pyrolysis furnace with an evacuated environment, with a pyrolysis pressure of between 0.01 and 0.10 mm Hg air. U.S. Pat. No. 6,565,631 also discloses a method of using CMS membranes to separate $CO_2$ from a methane stream containing 10% $CO_2$, at 1000 psia and 50° C., with a selectivity of approximately 45, a selectivity that is much higher than typical commercial polymeric membranes. U.S. Pat. No. 6,565,631 also discloses that CMS membranes can, unlike polymeric membranes, operate with trace amounts of hydrocarbon impurities with little loss in selectivity. Other patents that describe processes for producing carbon membranes (both asymmetric hollow "filamentary" and flat sheets), and applications for gas separation, include U.S. Pat. No. 5,288,304, and EP Patent No. 459,623, which are incorporated herein in their entireties.

Prior research has shown that CMS membrane separation properties are primarily affected by the following factors: (1) pyrolysis precursor, (2) pyrolysis temperature, (3) thermal soak time, and (4) pyrolysis atmosphere. The first three factors have been investigated in detail, but the effect of the fourth factor, pyrolysis atmosphere, has remained largely unknown.

For example, Steel and Koros performed a detailed investigation of the impact of pyrolysis temperature, thermal soak time, and polymer composition on the performance of carbon membranes. (K. M. Steel and W. J. Koros, Investigation of Porosity of Carbon Materials and Related Effects on Gas Separation Properties, *Carbon*, 41, 253 (2003).) Membranes were produced in an air atmosphere at 0.05 mm Hg pressure. The results showed that increases in both temperature and thermal soak time increased the selectivity but decreased permeance for $CO_2/CH_4$ separation. In addition, Steel et al showed that a precursor polymer with a rigid, tightly packed structure tends to lead to a CMS membrane having higher selectivity compared with less rigid precursor polymers.

The impact of pyrolysis atmosphere has been researched only to a limited extent. Suda and Haraya disclosed the formation of CMS membranes under different environments. (H. Suda and K. Haraya, Gas Permeation Through Micropores of Carbon Molecular Sieve Membranes Derived From Kapton Polyimide, *J. Phys. Chem. B*, 101, 3988 (1997).) CMS dense films were prepared from polyimide Kapton® at 1000° C. in either argon or in vacuum. According to their gas separation properties, the results of an $O_2/N_2$ separation were almost the same between 6 membranes formed under the different atmospheres. Suda and Haraya did not disclose the effects of atmosphere on $CO_2$ separation from natural gas, nor disclose how separation properties vary with oxygen concentration. Similarly, Geiszler and Koros disclosed the results of CMS fibers produced from pyrolysis of fluorinated polyimide in helium and argon for both $O_2/N_2$ and $H_2/N_2$ separations. (V. C. Geiszler and W. J. Koros, Effects of Polyimide Pyrolysis Atmosphere on Separation Performance of Carbon Molecular Sieve Membranes, J. Memb. Sci., (2009).). That paper disclosed a slightly higher selectivity and lower permeability with vacuum pyrolysis than the purged pyrolysis processes. In addition, Geiszler and Koros showed that the flow rate of the purge gases impacted performance. Geiszler and Koros, however, did not disclose the effects of atmosphere on $CO_2$ separation from natural gas, or the effects of oxygen concentration on separation properties.

The present inventors recently extended the study of pyrolysis environments, and proposed in publications that a critical factor impacting the separation performance of CMS membranes is oxygen exposure during pyrolysis. (M. Kiyono, P. J. Williams, and W. J. Koros, Effect of Pyrolysis Atmosphere on Separation Performance of Carbon Molecular Sieve Membranes, J. Memb. Sci., (2009); P. J. Williams, Analysis of Factors Influencing the Performance of CMS Membrane for Gas Separation, Georgia Institute of Technology (2006).) In the paper by Kiyono et al., the pyrolysis environment was purged with specialty gases containing controlled amounts of oxygen ranging from 4-50 ppm $O_2$ in argon flowing at 200 cc(STP)/min. The performance of the membranes was found to be a strong function of oxygen exposure. Neither paper, however, disclosed the effect of oxygen concentration, rather the total oxygen amount, on separation properties. The present inventors have since discovered that oxygen concentration, and not total oxygen amount, impacts the overall separation performance of the membranes and allows the membrane performance to be modified to optimize selectivity and permeability.

SUMMARY OF THE INVENTION

An aspect of the invention concerns a process for making a carbon membrane including providing a polymer precursor, heating the precursor in a chamber to at least a temperature at which pyrolysis byproducts are evolved, and flowing an inert gas through the chamber, the inert gas containing less than about 40 ppm of oxygen.

Another aspect of the invention concerns a process for reducing the concentration of acid gases in a natural gas stream that includes providing a carbon membrane produced by a process including the steps of providing a membrane formed of asymmetric hollow polymer fibers, heating the membrane in a chamber to at least a temperature at which pyrolysis byproducts are evolved, and flowing an inert gas through the chamber, the inert gas containing less than about 40 ppm of oxygen.

Another aspect of the invention is a process for optimizing the $CO_2/CH_4$ selectivity of a carbon membrane, the process including forming the membrane by providing a polymer precursor in the form of asymmetric hollow polymer fibers, heating the precursor in a chamber to at least a temperature at which pyrolysis byproducts are evolved, and flowing an inert gas through the chamber, the inert gas containing less than about 40 ppm of oxygen.

A further aspect of the invention is a process of reducing the concentration of acid gas in a natural gas feed stream comprising methane, acid gas (such as $CO_2$ or $H_2S$), and other natural gas contaminants such as heavy hydrocarbons, the process comprising directing the feed stream through a membrane produced by the process of providing a polymer precursor, heating the precursor in a chamber to at least a temperature at which pyrolysis byproducts are evolved, and flowing an inert gas through the chamber during the heating step, the inert gas containing less than about 40 ppm of oxygen, to produce a retentate gas stream having a reduced concentration of the acid gas relative to the feed stream and a permeate gas stream having an increased concentration of the acid gas relative to the feed stream.

Another aspect of the invention is a process for making a carbon membrane having a predetermined degree of $CO_2$ permeability, the process including providing a polymer precursor, heating the precursor in a chamber to at least a temperature at which pyrolysis byproducts are evolved, and flowing a gas through the chamber during the heating step, the concentration of oxygen in the gas being selected to produce a carbon membrane having the predetermined degree of $CO_2$ permeability.

Yet another aspect of the invention is a process for making a carbon membrane having a predetermined degree of $CO_2/CH_4$ selectivity, the process including providing a polymer precursor, heating the precursor in a chamber to at least a temperature at which pyrolysis byproducts are evolved, and flowing a gas through the chamber, the concentration of oxygen in the gas being selected to produce a carbon membrane having the predetermined degree of $CO_2/CH_4$ selectivity.

Another aspect of the invention concerns a gas separation apparatus including at least two carbon membranes having different gas separation properties. At least one membrane is produced by pyrolyzing a polymer precursor in an atmosphere having a first predetermined oxygen concentration, and at least another membrane is produced by pyrolyzing a polymer precursor in an atmosphere having a different predetermined oxygen concentration, the respective oxygen concentrations differing by at least 2 ppm oxygen to inert gas. Optionally, the apparatus may include at least two carbon membranes produced by separately pyrolyzing polymer precursors in atmospheres having oxygen concentrations differing by at least 4 ppm oxygen to inert gas, alternatively 6 ppm oxygen to inert gas, and alternatively 10 ppm oxygen to inert gas. For example, one carbon membrane may be provided which has a very high permeability but lower selectivity, while a second carbon membrane may be provided which has a lower permeability and higher selectivity.

A still further aspect of the invention concerns a process for making two or more carbon membranes having different predetermined degrees of $CO_2$ permeability, the process including providing a first polymer precursor, heating the first precursor in a first chamber to at least a temperature at which pyrolysis byproducts are evolved, flowing a first gas through the first chamber during the heating step, the concentration of oxygen in the first gas being selected to produce a carbon membrane having a first predetermined degree of $CO_2$ permeability. Then, the process includes providing a second polymer precursor, heating the second precursor in a second chamber to at least a temperature at which pyrolysis byproducts are evolved, and flowing a second gas through the second chamber during the heating step, the concentration of oxygen in the second gas being selected to produce a carbon membrane having a second predetermined degree of $CO_2$ permeability. The concentration of oxygen in the first gas differs from that of the second gas in this embodiment by at least 2 ppm, alternatively at least 4 ppm, alternatively at least 6 ppm, alternatively at least 10 ppm, alternatively at least 15 ppm.

Similarly, another aspect of the invention concerns a process for making two or more carbon membranes having different predetermined degrees of $CO_2/CH_4$ selectivity. The process includes providing a first polymer precursor, heating the first precursor in a first chamber to at least a temperature at which pyrolysis byproducts are evolved, flowing a first gas through the first chamber during the heating step, the concentration of oxygen in the first gas being selected to produce a carbon membrane having a first predetermined degree of $CO_2/CH_4$ selectivity. Then, the process comprises providing a second polymer precursor, heating the second precursor in a second chamber to at least a temperature at which pyrolysis byproducts are evolved, and flowing a second gas through the second chamber during the heating step, the concentration of oxygen in the second gas being selected to produce a carbon membrane having a second predetermined degree of $CO_2/CH_4$ selectivity. The concentration of oxygen in the first gas differs from that of the second gas in this embodiment by at least 2 ppm, alternatively at least 4 ppm, alternatively at least 6 ppm, alternatively at least 10 ppm, alternatively at least 15 ppm.

Other aspects of the invention will be apparent from this disclosure and the accompanying drawings.

BRIEF DESCRIPTION OF THE DRAWINGS

FIG. 6 is a chart of separation performance of CMS membranes produced from Matrimid® polymeric precursor, showing $CO_2$ permeability and $CO_2/CH_4$ selectivity as a function of varying pyrolysis atmosphere flow rate.

FIG. 7 is a chart of separation performance of CMS membranes produced from Matrimid® polymeric precursor, showing $CO_2$ permeability and $CO_2/CH_4$ selectivity as a function of varying precursor polymer thickness.

DETAILED DESCRIPTION OF THE INVENTION

Figure 1:
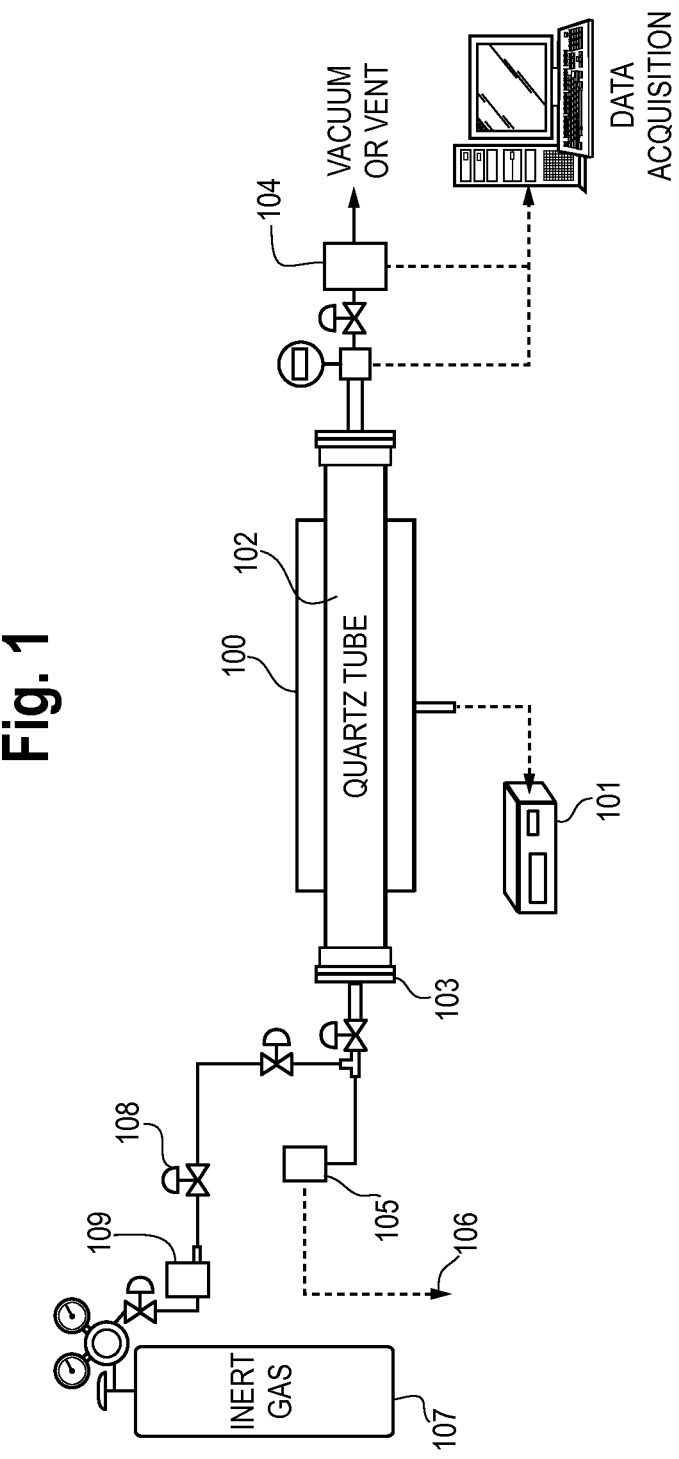
FIG. 1 is an exemplary pyrolysis apparatus for synthesis of carbon molecular sieve membrane films.

The present invention will now be described more fully hereinafter with reference to the accompanying drawings, in which one or more embodiments of the invention are shown. This invention may, however, be embodied in many different forms and should not be construed as limited to the embodiments described herein. Rather, these embodiments are examples of the invention, which has the full scope indicated by the language of the claims. Like numbers refer to like elements throughout.

In the following examples and embodiments, methods for producing CMS membranes are provided. The CMS membranes can advantageously have optimized gas separation performance properties, such properties being optimized by controlling the concentration of oxygen in the pyrolysis atmosphere.

Polymeric Precursor Fibers or Films

A polymeric material is the starting material for preparation of the present carbon molecular sieve membranes. The polymeric material is alternatively a polymeric fiber or a polymeric film.

One useful polymer precursor is Matrimid® 5218, a commercially available polyimide available from Huntsman Advanced Materials (formerly Vantico, Inc.). Matrimid® 5218 is a thermoplastic polyimide based on a proprietary diamine, 5(6)-amino-1-(4' aminophenyl)-1,3,-trimethylindane. An alternative polymer precursor is 6FDA/BPDA-DAM, a polyimide synthesized by the thermal imidization method from three monomers: 2,4,6-trimethyl-1,3-phenylene diamine, 5,5'-[2,2,2-trifluoro-1-(trifluoromethyl)ethylidene]-1,3-isobenzofurandion, and 3,3',4,4'-biphenyl tetra carboxylic acid dianhydride, all available from Sigma Aldrich, St. Louis, Mo. The chemical structure of 6FDA/BPDA-DAM is shown below:

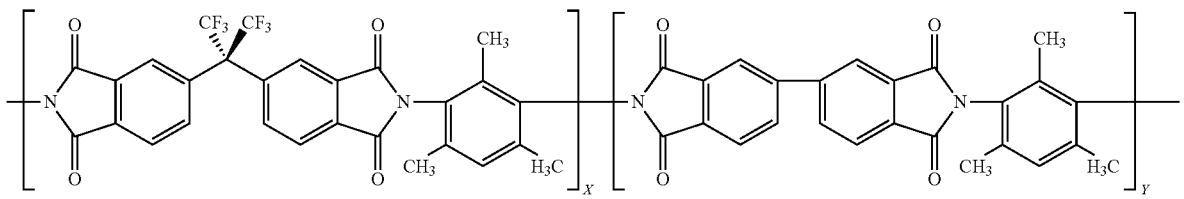

A 1:1 ratio of components X and Y may advantageously be used.

Both Matrimid® 5218 and 6FDA/BPDA-DAM are advantageously initially provided as polymeric powders. In one embodiment, homogenous polymeric dense films are prepared from the polymeric powder by any suitable means. For example, the polymeric powders can be dried in a vacuum oven to remove moisture, dissolved in a suitable solvent, and prepared into polymer dense films by the solution casting method. After solution casting, the films may be again dried in a vacuum oven to remove residual solvent. Once the films are prepared, they may be cut into small discs suitable for use in a permeation cell.

In another embodiment, as described in U.S. Pat. No. 6,565,631, the polymer precursors may be provided as polymeric fibers. The polymeric fiber, advantageously Matrimid® or 6FDA/BPDA-DAM, may be spun by any conventional method, e.g., spun from a polymer solution through a spinneret. Such fibers are available from E.I. du Pont de Nemours and Company and L'Air Liquide S. A. For example, such a polymer is described in U.S. Pat. No. 5,234,471, which disclosure is incorporated by reference in its entirety. Such fibers may be symmetric (i.e., have a consistent morphology) or asymmetric (i.e., having two or more structural planes of non-identical morphologies). Without limiting the present disclosure, commercially available polymeric fibers are asymmetric and typically have an outer diameter of about 250 μm and an inner diameter of about 160 μm.

Pyrolysis of Polymeric Precursor to Create CMS Membranes

Polymeric films or fibers may then be pyrolyzed to produce CMS membranes. In the case of polymeric films, the films may be placed on a quartz plate, which is optionally ridged to allow for the diffusion of volatile by-products from the top and bottom of the films into the effluent stream. The quartz plate and films may then be loaded into a pyrolysis setup. In the case of polymeric fibers, the fibers may be placed on the quartz plate and/or a piece of stainless steel mesh and held in place by any conventional means, e.g., by wrapping a length of bus wire around the mesh and fibers. The mesh support and fibers may then be loaded into the pyrolysis setup. In another embodiment, the fibers may be secured on one of both ends by any suitable means and placed vertically in a pyrolysis chamber. Additional methods may also be used to place the polymer fibers into a pyrolysis setup.

1. Pyrolysis Equipment

FIG. 1 illustrates an exemplary pyrolysis setup. Other suitable pyrolysis equipment, however, as known in the art may be used, and FIG. 1 is not intended to limit the present invention. As shown in FIG. 1, a temperature controller 101 is used to heat a furnace 100 and a quartz tube 102. An assembly 103 of a metal flange with silicon O-rings may be used on both ends of the quartz tube to seal the tube to reduce leaks when performing pyrolysis under vacuum. For vacuum pyrolysis, a pump (not shown) is provided (for example, an Edwards model RV3) that is capable of creating a low pressure from 0.005 to 0.042 torr, and a liquid nitrogen trap (not shown) may be used to prevent any back diffusion of oil vapor from the pump. The pressure inside the tube may be monitored with a pressure transducer 105 (for example, an MKS Instruments 628B capacitance manometer with 0.5% accuracy below 1 torr) attached to a digital read-out 106 (for example, an MKS Instruments PDR2000). For processes using purged gas during pyrolysis, an inert gas source 107 is provided, with a micro needle valve 108 installed in the gas line for permitting a flow of oxygen (air) into the purge gas. The flow rate of the gas may be controlled with a mass flow controller 109 (for example, MKS Instruments type 247), and confirmed with a bubble flow meter (not shown, for example, Fisher Scientific model 520) before and after each process. Any oxygen analyzer 104, for example a Cambridge Sensotec Ltd. Rapidox 2100 series with ±1% accuracy between $10^{-20}$ ppm and 100% may be integrated with the system to monitor oxygen concentration during the pyrolysis process. Between processes, the quartz tube and plate are optionally rinsed with acetone and baked in air at 800° C. to remove any deposited materials which could affect consecutive runs.

2. Pyrolysis Heating Parameters

U.S. Pat. No. 6,565,631 describes a heating method for pyrolysis of polymeric fibers to form CMS membranes, and is incorporated herein by reference. For either polymeric films or fibers, a pyrolysis temperature of between about 450° C. to about 800° C. may advantageously be used, although as discussed below, the pyrolysis temperature can be adjusted in combination with the pyrolysis atmosphere to tune the performance properties of the resulting CMS membrane. For example, the pyrolysis temperature may be 1000° C. or more. Optionally, the pyrolysis temperature is maintained between about 500° C. and about 550° C. The pyrolysis soak time (i.e., the duration of time at the pyrolysis temperature) may vary (and may include no soak time) but advantageously is between about 1 hour to about 10 hours, alternatively from about 2 hours to about 8 hours, alternatively from about 4 hours to about 6 hours. An exemplary heating protocol may include starting at a first set point of about 50° C., then heating to a second set point of about 250° C. at a rate of about 13.3° C. per minute, then heating to a third set point of about 535° C. at a rate of about 3.85° C. per minute, and then a fourth set point of about 550° C. at a rate of about 0.25° C. per minute. The fourth set point is then optionally maintained for the determined soak time. After the heating cycle is complete, the system is typically allowed to cool while still under vacuum or in a controlled atmosphere.

3. Pyrolysis Atmosphere

Embodiments of the present disclosure advantageously utilize a controlled purge gas atmosphere during pyrolysis. It has been found that by varying the concentration of oxygen in the pyrolysis atmosphere, one can control or tune the gas separation performance properties of the resulting CMS membrane. By way of example, an inert gas such as argon is used as the purge gas atmosphere. Other suitable inert gases include, but are not limited to, nitrogen, helium, or any combinations thereof. By using any suitable method such as a valve, the inert gas containing a specific concentration of oxygen may be introduced into the pyrolysis atmosphere. For example, the amount of oxygen in the purge atmosphere is less than about 50 ppm (parts per million) $O_2/Ar$. Alternatively, the amount of oxygen in the purge atmosphere is less than 40 ppm $O_2/Ar$. Embodiments of the present disclosure may also use pyrolysis atmospheres with about 8 ppm, 7 ppm, or 4 ppm $O_2/Ar$. As discussed in more detail below, by including a small amount of oxygen in the pyrolysis atmosphere, one can dope the CMS membrane material with oxygen in a controlled manner, to achieve predetermined gas separation performance.

Alternatively, pyrolysis may be performed under vacuum. If a vacuum is used, the pressure during pyrolysis is advantageously from about 0.01 mm Hg to about 0.10 mm Hg. In one alternative embodiment, the system is evacuated until the pressure is 0.05 mm Hg or lower.

Construction of CMS Membrane Permeation Cells

Once CMS membranes are prepared, they may be loaded or assembled into suitable permeation cells or modules. For example, if a CMS film is used, it may be first masked using impermeable aluminum tape, and only a specific area exposed for permeation. Epoxy (e.g., Devcon, Danvers, Mass.) may be applied at the interface of the tape and the film to further minimize any gas leak. Such an assembly may then optionally be placed in a permeation cell, such as a double O-ring flange permeation cell.

If CMS fibers are used, a suitable plurality of the pyrolyzed fibers may be bundled together to form a separation unit. The number of fibers bundled together will depend on fiber diameters, lengths, and on desired throughput, equipment costs, and other engineering considerations understood by those in the chemical engineering arts. The fibers may be held together by any conventional means. This assembly may then typically be disposed in a pressure shell such that one end of the fiber assembly extends to one end of the pressure shell and the opposite end of the fiber assembly extends to the opposite end of the pressure shell. The fiber assembly is then fixably or removably affixed to the pressure shell by any conventional method to form a pressure tight seal.

For industrial use, a permeation cell or module made using either pyrolyzed film or fibers may be operated, as described in U.S. Pat. No. 6,565,631, e.g., as a shell-tube heat exchanger, where the feed is passed to either the shell or tube side at one end of the assembly and the product is removed from the other end. For maximizing high pressure performance, the feed is advantageously fed to the shell side of the assembly at a pressure of greater than about 10 barr, and alternatively at a pressure of greater than about 40 barr. The feed may be any gas having a component to be separated, such as a natural gas feed containing an acid gas such as $CO_2$. For example, the feed gas may contain at least about 1% acid gas, or alternatively at least about 3% acid gas. At least a portion of the acid gas in the feed may advantageously be passed through the membrane to the tube side, i.e., inside the membranes. Acid-gas-depleted feed is then removed from the opposite end of the shell side of the assembly. Any conventional recycle scheme may be used to optimize a desired purity level.

In order to perform small-scale permeation tests, a test module may be constructed. When using CMS films, the permeation cell may be placed in a permeation system in which a constant-volume variable-pressure method is utilized. Exemplary methods of constructing such a permeation system have been disclosed by Pye, et al. (D. G. Pye, H. H. Hoehn, and M. Panar, Measurement of Gas Permeability of Polymers I, J. Appl. Polym. Sci., 20, 1921 (1976) and D. G. Pye, H. H. Hoehn, and M. Panar, Measurement of Gas Permeability of Polymers II, J. Appl. Polym. Sci., 20, 287 (1976).) Both upstream and downstream of the permeation system are evacuated for at least 12 hours, and a leak rate for the entire permeation system is measured, which is preferably less than 1% of the permeability of the slowest gas. Once the system is evacuated, the upstream is pressured with a testing gas while the downstream is maintained at a vacuum, but isolated from the vacuum pump. The pressure rise in a standard volume on the downstream can be calculated with time by a data acquisition software, such as LabView (National Instruments, Austin, Tex.) and permeability can be calculated. The system may advantageously be evacuated each time before experiments with different gases for at least 12 hours.

To perform small-scale permeation tests using CMS fibers, a test module consisting of a single CMS fiber may be constructed and tested as described in U.S. Pat. No. 6,565,631.

Tuning Gas Separation Performance Properties of CMS Membranes

The described preparation of CMS membranes leads to an almost pure carbon material. Such materials are believed to have a highly aromatic structure comprising disordered $sp^2$ hybridized carbon sheet, a so-called "turbostratic" structure. The structure can be envisioned to comprise roughly parallel layers of condensed hexagonal rings with no long range three-dimensional crystalline order. Pores are formed from packing imperfections between microcrystalline regions in the material, and pore structure in CMS membranes is known to have a slit-like structure. The structure has bimodal pore size distribution of micropore and ultramicropore, which is known to be responsible for the molecular sieving gas separation process.

Figure 2:
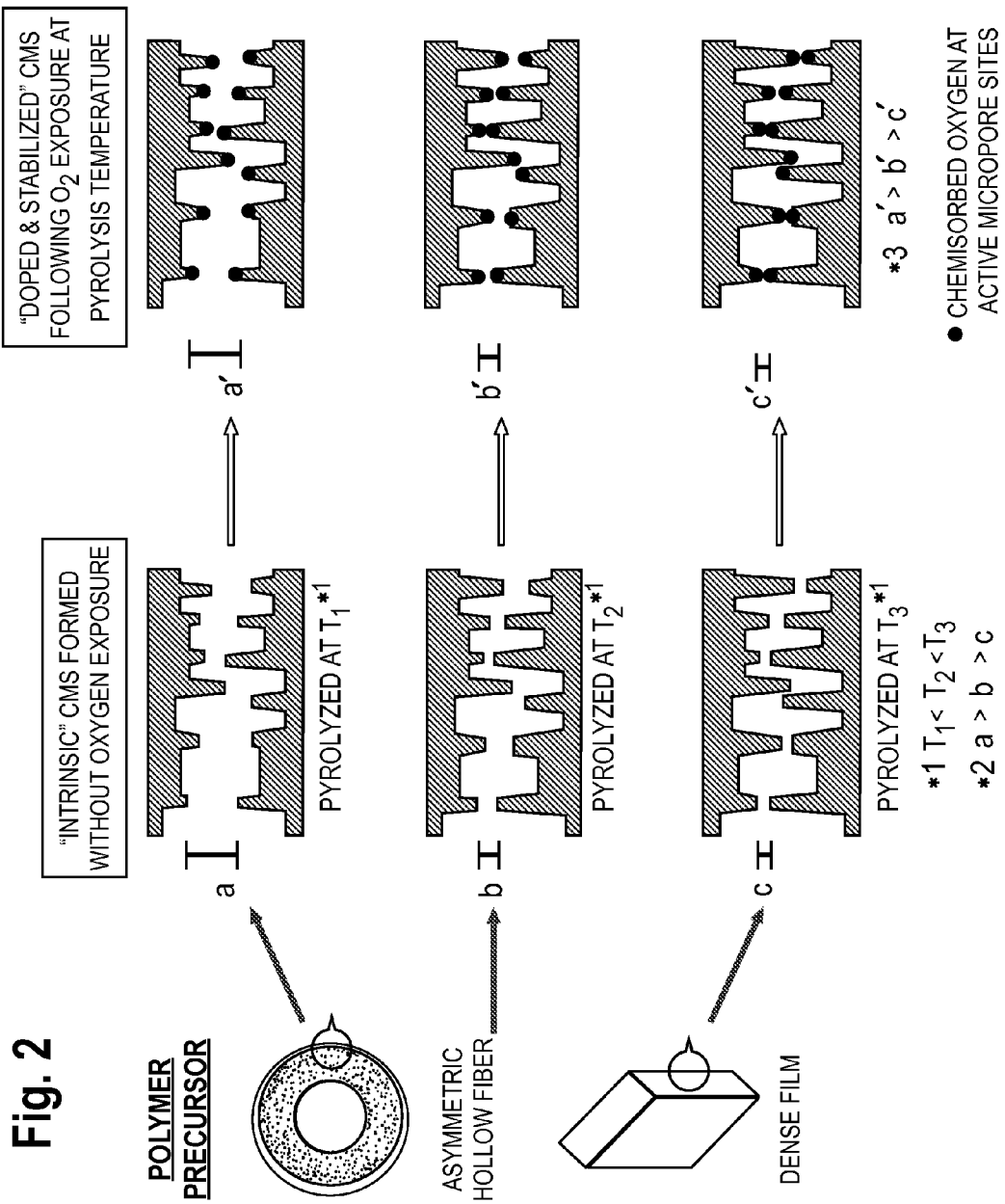
FIG. 2 is a schematic of the oxygen doping process during pyrolysis.

The micropores are believed to provide adsorption sites, and ultramicropores are believed to act as molecular sieve sites. The ultramicropores are believed to be created at "kinks" in the carbon sheet, or from the edge of a carbon sheet. These sites have more reactive unpaired sigma electrons prone to oxidation than other sites in the membrane. Based on this fact, it is believed that by tuning the amount of oxygen exposure, the size of selective pore windows can be tuned. It is also believed that tuning oxygen exposure results in oxygen chemisorption process on the edge of the selective pore windows Specifically, it has been found that for pyrolyzed polyimides in particular, gas separation performance can be tuned by "doping" the CMS membrane with oxygen in a controlled manner, as shown in FIG. 2. At a given pyrolysis protocol (temperature, ramp rate, soak time), an intrinsic carbon structure is formed due to the decomposition of the polymer followed by some compaction of the resulting amorphous carbon. When oxygen is added, another process occurs whereby the oxygen is incorporated into the intrinsic carbon structure and changes the pore size distribution. Selective pore sizes in the range of 3.4 to 4.2 angstroms provide high $CO_2/CH_4$ selectivity. Pores of about 3.8 angstroms have the advantage of also providing high permeability.

In CMS membranes made from 6FDA/BPDA-DAM polyimide, a pyrolysis oxygen concentration of less than about 40 ppm $O_2$/inert gas provides optimized $CO_2/CH_4$ selectivity. Optionally, an oxygen concentration of between 8 ppm $O_2$/inert gas and 40 ppm $O_2$/inert gas is believed to provide the highest $CO_2/CH_4$ selectivity, particularly for membranes produced at temperatures below 550° C.

For CMS membranes made from Matrimid® 5218 polyimide based on a diamine, 5(6)-amino-1-(4' aminophenyl)-1, 3,-trimethylindane, both $CO_2/CH_4$ selectivity and $CO_2$ permeability decrease with increasing pyrolysis atmosphere oxygen concentration. If high $CO_2/CH_4$ selectivity and high $CO_2$ permeability is desired, one may pyrolyze the polymer in an atmosphere having an oxygen concentration of less than about 10 ppm $O_2$/inert gas.

The present methods can further be utilized by tuning pyrolysis temperature in conjunction with the oxygen concentration in the pyrolysis atmosphere. As disclosed by Steel, et al., which is incorporated by reference herein, higher pyrolysis temperature leads to lower permeability and higher selectivity. It is believed that lowering pyrolysis temperature produces more open CMS structures. This can, therefore, make the doping process more effective in terms of increasing selectivity for challenging gas separations for intrinsically permeable polymer precursors. Therefore, by controlling the pyrolysis temperature and the concentration of oxygen one can tune oxygen doping and, therefore, gas separation performance. In general, more oxygen and higher temperature leads to smaller pores. Higher temperatures generally cause the formation of smaller micro and ultramicropores, while more oxygen generally causes the formation of small selective ultramicropores without having a significant impact on the larger micropores into which gases are absorbed.

The combination of oxygen concentration and pyrolysis temperature, therefore, provides enhanced tuning of CMS performance. For example, in CMS membranes made from 6FDA/BPDA-DAM polyimide, if high $CO_2/CH_4$ selectivity is desired, one may advantageously use a pyrolysis oxygen concentration of between about 8 ppm $O_2$/inert gas and about 40 ppm $O_2$/inert gas, together with a pyrolysis temperature of greater than 550° C. and optionally up to about 1000° C. If high $CO_2$ permeability is desired, one may advantageously use a pyrolysis oxygen concentration of less than about 30 ppm $O_2$/inert gas, and alternatively a pyrolysis oxygen concentration of less than about 8 ppm $O_2$/inert gas, together with a pyrolysis temperature of less than about 550° C. and alternatively less than about 500° C.

Similarly, in CMS membranes made from Matrimid® 5218 polyimide based on a diamine, 5(6)-amino-1-(4' aminophenyl)-1,3, -trimethylindane, if high $CO_2/CH_4$ selectivity is desired, it is advantageous to use a pyrolysis oxygen concentration of less than about 40 ppm $O_2$/inert gas, alternatively less than about 8 ppm $O_2$/inert gas, together with a pyrolysis temperature of greater than about 550° C. and alternatively up to about 1000° C. If a lower $CO_2/CH_4$ selectivity is desired, it is advantageous to use a pyrolysis oxygen concentration of greater than about 40 ppm $O_2$/inert gas or less than about 8 ppm $O_2$/inert gas, alternatively greater than about 50 ppm $O_2$/inert gas, together with a pyrolysis temperature of greater than 550° C., optionally up to about 1000° C.

One embodiment of the present invention, therefore, is a gas separation apparatus having at least two carbon membranes having different gas separation properties. At least one membrane is produced by pyrolyzing a polymer precursor in an atmosphere having a first predetermined oxygen concentration, and at least another membrane is produced by pyrolyzing a polymer precursor in an atmosphere having a different predetermined oxygen concentration, the respective oxygen concentrations differing by at least 2 ppm oxygen to inert gas. Optionally, the apparatus may include at least two carbon membranes produced by separately pyrolyzing polymer precursors in atmospheres having oxygen concentrations differing by at least about 4 ppm oxygen to inert gas, alternatively about 6 ppm oxygen to inert gas, alternatively about 10 ppm oxygen to inert gas, alternatively about 15 ppm oxygen to inert gas. For example, one carbon membrane may be provided which has a very high permeability but lower selectivity, while a second carbon membrane may be provided which has a lower permeability and higher selectivity. Alternatively, two or more carbon membranes may have, for example, a $CO_2/CH_4$ selectivity differing one from the other by about 10 or more, and alternatively by about 20 or more, alternatively by about 30 or more, alternatively by about 50 or more. Optionally, two or more carbon membranes may have, for example, $CO_2$ permeabilities differing one from the other by at least about 10 Barrer, alternatively about 10 Barrer, alternatively about 50 Barrer, alternatively about 100 Barrer, alternatively about 200 Barrer. This is particularly useful in an embodiment in which one or more membranes are used in series, wherein the concentration of, for example, $CO_2$ or $H_2S$ in a feed gas stream is depleted as the gas stream passes from one membrane to another.

Another embodiment of the present invention is a process for making two or more carbon membranes having different predetermined degrees of $CO_2$ permeability or $CO_2/CH_4$ selectivity. A first polymer precursor and a second polymer precursor are provided. The first precursor is heated in a first chamber to at least a temperature at which pyrolysis byproducts are evolved, for example about 500° C. to about 550° C., alternatively greater than 600° C., alternatively greater than 700° C., alternatively greater than 800° C. A first gas is flowed through the first chamber during the heating step, the concentration of oxygen in the first gas selected to produce a carbon membrane having a first predetermined degree of $CO_2$ permeability. The concentration of oxygen in the first gas may be, for example, between 2 ppm $O_2$/inert gas to 40 ppm $O_2$/inert gas, alternatively 4 ppm $O_2$/inert gas to 30 ppm $O_2$/inert gas, alternatively 4 ppm $O_2$/inert gas to 10 ppm $O_2$/inert gas. The second precursor is heated in a second chamber to at least a temperature at which pyrolysis byproducts are evolved. The temperature may be the same as the heating temperature for the first polymer precursor, or may differ by about 50° C., alternatively by about 100° C., alternatively by about 200° C., alternatively by about 300° C. A second gas is flowed through the second chamber during the heating step, the concentration of oxygen in the second gas being selected to produce a carbon membrane having a second predetermined degree of $CO_2$ permeability. The concentration of oxygen in the second gas differs from the concentration in the first gas by about 2 ppm oxygen, alternatively by about 4 ppm oxygen, alternatively by about 6 ppm oxygen, alternatively by about 10 ppm oxygen, alternatively by about 20 ppm oxygen, alternatively by about 25 ppm oxygen, alternatively by about 30 ppm oxygen. For example, one carbon membrane may be provided which has a very high permeability but lower selectivity, while a second carbon membrane may be provided which has a lower permeability and higher selectivity. Alternatively, two or more carbon membranes have, for example, a $CO_2/CH_4$ selectivity differing one from the other by about 10 or more, alternatively, by at least about 20 or more, alternatively by at least about 30 or more, alternatively by at least about 50 or more. Optionally, two or more carbon membranes have, for example, $CO_2$ permeabilities differing one from the other by at least about 10 Barrer, alternatively by at least about 10 Barrer, alternatively by at least about 50 Barrer, alternatively by at least about 100 Barrer, alternatively by at least about 200 Barrer.

EXAMPLES

The following examples illustrate several of the exemplary embodiments of the present disclosure. The examples relate to two useful polymeric precursors, and they describe results for specific pyrolysis temperature, oxygen concentrations, and the like. One of ordinary skill in the art will appreciate, however, based on the foregoing detailed description, how to conduct the following exemplary methods using other suitable polymeric precursors, and with varying pyrolysis parameters, and how to scale the examples to industrial applications.

Example 1

CMS Films from 6FDA/BPDA-DAM Polyimide

A CMS film is prepared using a 6FDA/BPDA-DAM polyimide synthesized by condensation followed by the thermal imidization from three monomers: 2,4,6-trimethyl-1,3-phenylene diamine (DAM), 5,5-[2,2,2-trifluoro-1-(trifluoromethyl)ethylidene]-1,3-isobenzofurandion (6FDA), and 3,3',4,4'-biphenyl tetra carboxylic acid dianhydride (BPDA), all available from Sigma Aldrich, St. Louis, Mo. In this study, the reaction stoichiometry was adjusted to have the ratio of BPDA to DAM of 1:1. Homogenous polymeric dense films were prepared by first drying the polymer powder in a vacuum oven at 110° C. for at least 12 hours to remove moisture. Then, the powder was dissolved in dichloromethane (Sigma-Aldrich, ≧99.8% purity) to form a polymer solution (3-5% wt), and placed on rollers for at least 12 hours for mixing. After mixing, polymer dense films were prepared by a solution casting method in a glove bag at room temperature to achieve a slow solvent evaporation rate. After solvent was evaporated (usually in 3-4 days), films were removed from the casting setting and placed in a vacuum oven at 110° C. for at least 12 hours to remove residual solvent. Once the films were removed from the oven, they were cut into small discs with a diameter of 2.54 cm. All films had a thickness of approximately 60±10 μm for consistency.

The polymer films were then pyrolyzed in the exemplary pyrolysis apparatus described above and as illustrated in FIG. 1. A pyrolysis temperature of 550° C. and a two hour soak time was used as a temperature protocol, with the same ramp rates and soak times used by Geiszler and Koros. (V. C. Geiszler and W. J. Koros, Effects of Polyimide Pyrolysis Conditions on Carbon Molecular Sieve Membrane Properties, Ind. Eng. Chem. Res., 35, 2999 (1996).) Pyrolysis was performed on film samples using four different pyrolysis atmospheres: 4 ppm $O_2$/Ar, 8 ppm $O_2$/Ar, 30 ppm $O_2$/Ar, and 50 ppm $O_2$/Ar, each flowed through the pyrolysis chamber at a rate of 200 cc (STP)/min. An additional film was prepared using an 8 hour thermal soak time at 550° C., and with a pyrolysis atmosphere of 7 ppm $O_2$/Ar.

After the CMS films were produced by the foregoing process, they were immediately loaded into permeation cells. Additionally, a permeation cell was prepared using a non-pyrolyzed 6FDA/BPDA-DAM polyimide film. The films were first masked using impermeable aluminum tape, and only a specific area was exposed for permeation. Epoxy (Devcon, Danvers, Mass.) was applied at the interface of the tape and the film to further minimize any gas leak. This assembly was placed in a double O-ring flange permeation cell. Each cell was placed in a permeation system in which a constant-volume variable pressure method was employed, according to the methods disclosed by Pye, et al. (D. G. Pye, H. H. Hoehn, and M. Panar, Measurement of Gas Permeability of Polymers I, J. Appl. Polym. Sci., 20, 1921 (1976) and D. G. Pye, H. H. Hoehn, and M. Panar, Measurement of Gas Permeability of Polymers II, J. Appl. Polym. Sci., 20, 287 (1976).) Both upstream and downstream of the permeation system were evacuated for at least 12 hours, and a leak rate is measured, which was less than 1% of the permeability rate of the slowest gas. Once the system was evacuated, the upstream was pressured with a testing gas containing a testing gas of either $CO_2$ or $CH_4$ while the downstream was maintained at a vacuum, but isolated from the vacuum pump. The temperature of the system was set at 35° C. The pressure rise in a standard volume on the downstream was calculated with time by a data acquisition software, such as LabView (National Instruments, Austin, Tex.), and $CO_2$ permeability and $CO_2/CH_4$ selectivity were calculated. The system was evacuated each time before experiments with different gases for at least 12 hours.

Figure 3:
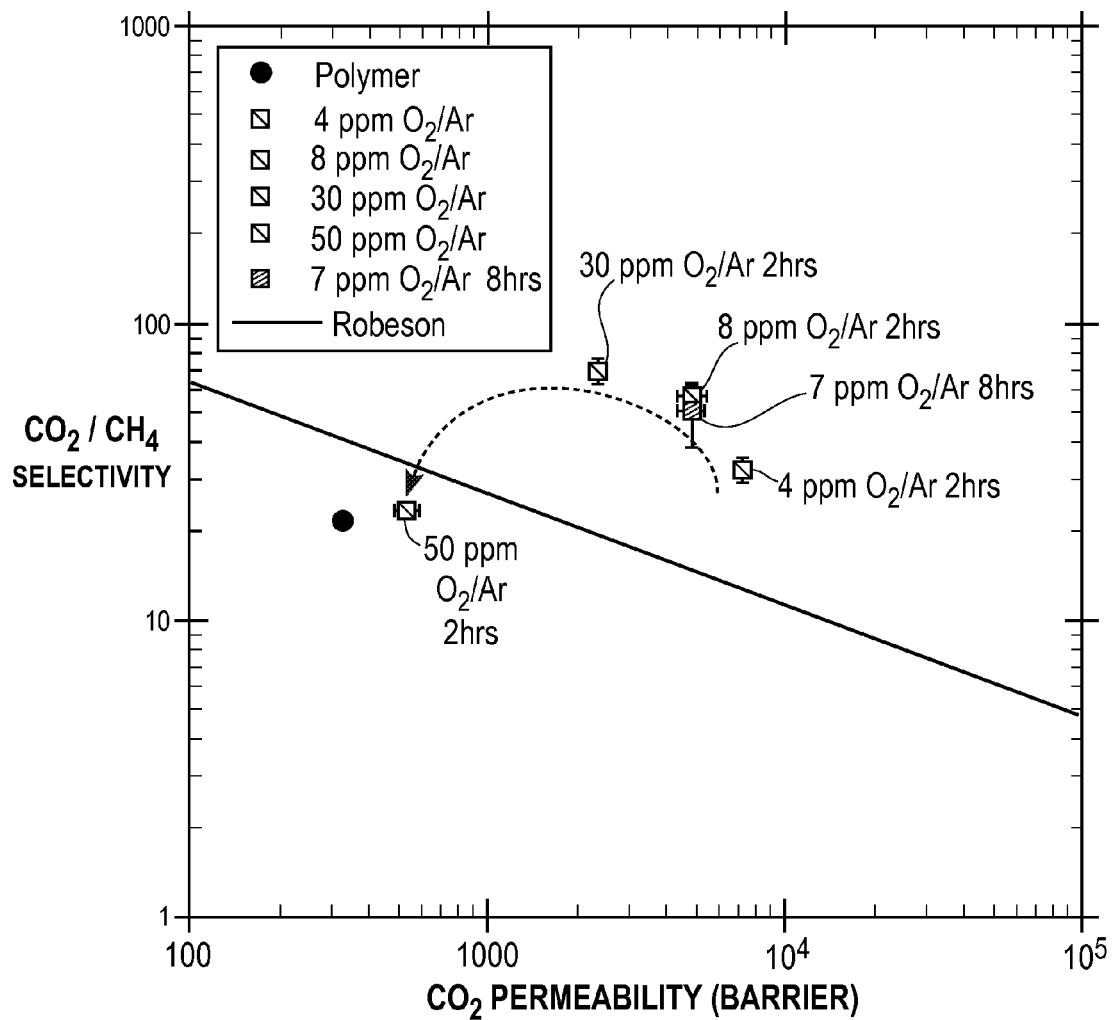
FIG. 3 is a chart of separation performance of 6FDA/BPDA-DAM carbon molecular sieve dense films, showing $CO_2$ permeability and $CO_2/CH_4$ selectivity as a function of varying oxygen concentration in the pyrolysis atmosphere. Permeability and selectivity of the non-pyrolyzed 6FDA/BPDA-DAM precursor polymer is also shown.

Experimental Results:

1. Separation Performance of CMS Membranes Produced from 6FDA-BPDA-DAM Polyimide with Varying Pyrolysis Oxygen Concentrations FIG. 3 illustrates the results of the $CO_2$ permeability and $CO_2/CH_4$ selectivity tests on the five CMS films pyrolyzed with varying concentrations of oxygen in the pyrolysis atmosphere, as well as the $CO_2$ permeability and $CO_2/CH_4$ selectivity of a non-pyrolyzed 6FDA/BPDA-DAM polyimide film. As FIG. 3 shows, each of the pyrolyzed CMS films exhibited higher $CO_2$ permeability and higher $CO_2/CH_4$ selectivity than the non-pyrolyzed precursor film. Additionally, FIG. 3 shows that $CO_2$ permeability decreased with increasing oxygen concentration in the pyrolysis atmosphere. At the same time, $CO_2/CH_4$ selectivity increased between 4 ppm $O_2$/Ar and 30 ppm $O_2$/Ar, but then showed a decrease again with the 50 ppm $O_2$/Ar film. Also indicated is the so-called "Robeson Upper bound" for polymeric membranes that gives the theoretical separation performance boundary for glassy polymer membranes. (L. Robeson, *Journal of Membrane Science*, 62 (1991), p 168-185.)

2. Separation Performance of CMS Membranes Produced from 6FDA-BPDA-DAM Polyimide with Varying Soak Time FIG. 3 also illustrates that thermal soak time does not have a significant impact on $CO_2$ permeability and $CO_2/CH_4$ selectivity for pyrolyzed 6FDA-BPDA-DAM polyimide as compared to pyrolysis atmosphere oxygen concentration. As shown in FIG. 3, the $CO_2$ permeability and $CO_2/CH_4$ selectivity for a CMS film prepared using a 2 hour soak time and 8 ppm $O_2$/Ar was nearly identical to, and within the range of experimental error, to the values for a CMS film prepared using an 8 hour soak time and 7 ppm $O_2$/Ar.

Example 2

CMS Films from Matrimid® Polyimide

A CMS film is prepared using Matrimid® 5218, a commercially available polyimide available from Huntsman Advanced Materials (formerly Vantico, Inc.). Matrimid® 5218 is a thermoplastic polyimide based on a proprietary diamine, 5(6)-amino-1-(4' aminophenyl)-1,3,-trimethylindane. Homogenous polymeric dense films were prepared using the same procedure as in Example 1. The polymer films were then pyrolyzed in the exemplary pyrolysis apparatus of Example 1. A pyrolysis temperature of 550° C. and a two hour soak time was used as a temperature protocol, with the same ramp rates and soak times used in Example 1. Pyrolysis was performed on film samples using six different pyrolysis atmospheres: vacuum, 3 ppm $O_2$/Ar, 10 ppm $O_2$/Ar, 30 ppm $O_2$/Ar, 50 ppm $O_2$/Ar, and 100 ppm $O_2$/Ar. Further, CMS films were also prepared to test possible variations based on other factors. Films were prepared using 30 ppm $O_2$/Ar oxygen concentration and two different flow rates; 50 cc (STP)/min and 200 cc(STP)/min. Additionally, films were prepared using 30 ppm $O_2$/Ar oxygen and two different film thicknesses; 4 mil and 2 mil.

Figure 4:
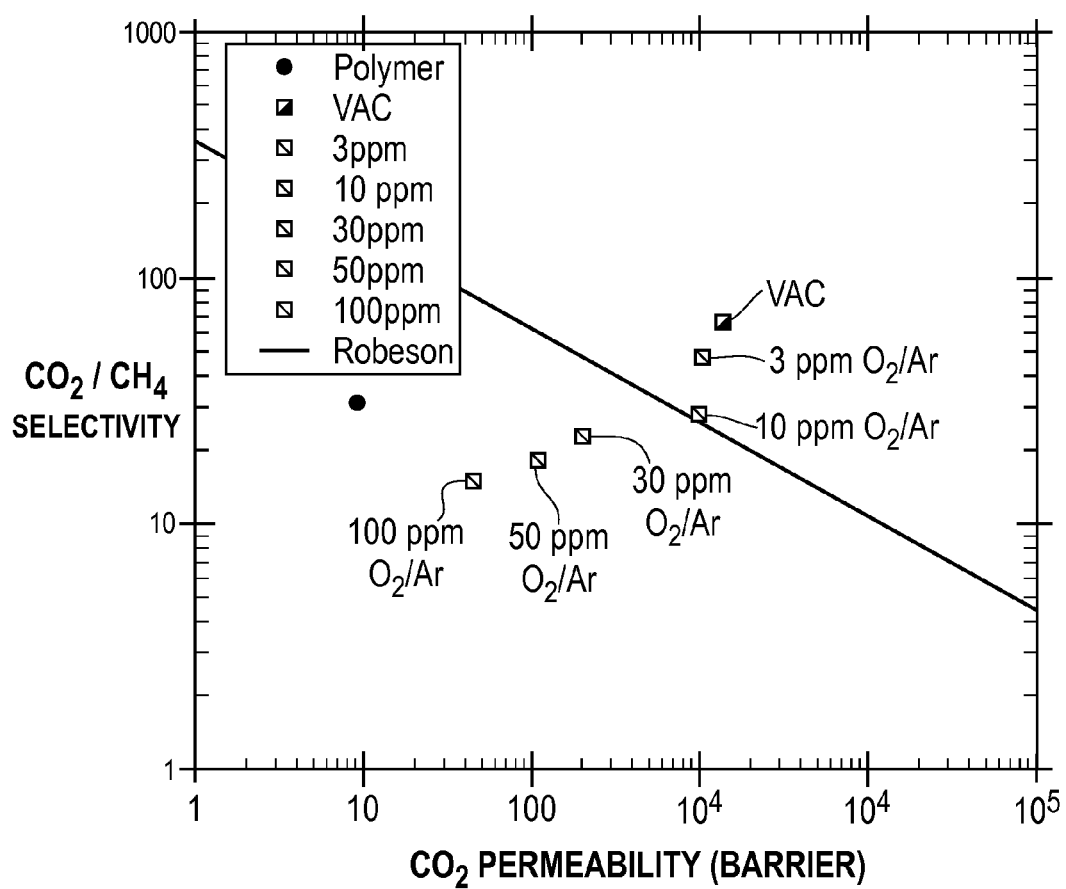
FIG. 4 is a chart of separation performance of Matrimid® derived carbon molecular sieve membranes, showing $CO_2$ permeability and $CO_2/CH_4$ selectivity as a function of varying oxygen concentration in the pyrolysis atmosphere. Permeability and selectivity of the non-pyrolyzed Matrimid® precursor polymer is also shown.

Experimental Results:

1. Separation Performance of CMS Membranes Produced from Matrimid® Precursors with Varying Pyrolysis Oxygen Concentrations FIG. 4 illustrates the results of the $CO_2$ permeability and $CO_2/CH_4$ selectivity tests on the six CMS films pyrolyzed with varying concentrations of oxygen in the pyrolysis atmosphere, as well as the $CO_2$ permeability and $CO_2/CH_4$ selectivity of a non-pyrolyzed 6FDA/BPDA-DAM polyimide film. As FIG. 4 shows, each of the pyrolyzed CMS films exhibited higher $CO_2$ permeability than the non-pyrolyzed polymeric precursor film. Additionally, FIG. 4 shows that $CO_2$ permeability and $CO_2/CH_4$ selectivity both decreased with increasing oxygen concentration in the pyrolysis atmosphere. Also indicated is the so-called "Robeson line."

Figure 5:
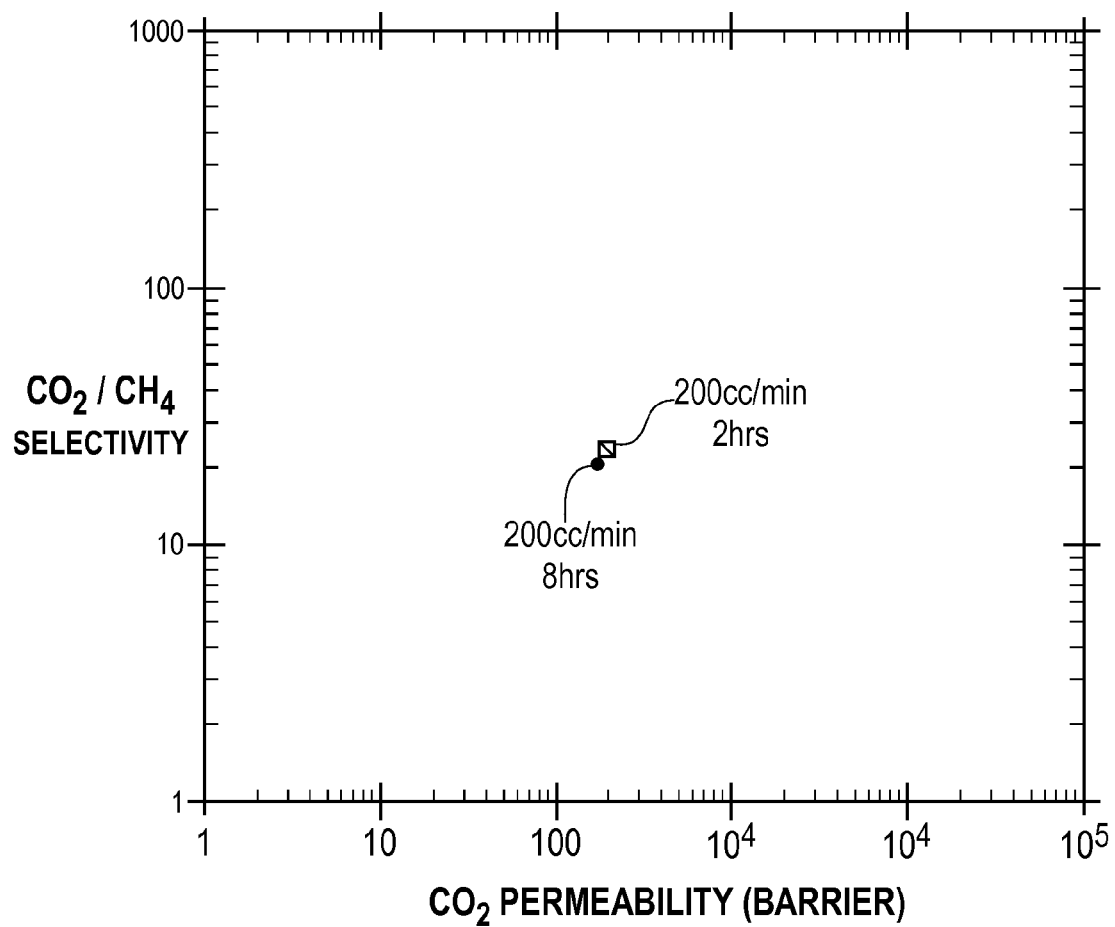
FIG. 5 is a chart of separation performance of CMS membranes produced from Matrimid® polymeric precursor, showing $CO_2$ permeability and $CO_2/CH_4$ selectivity as a function of varying soak time.

2. Separation Performance of CMS Membranes Produced from Matrimid® Polymeric Precursors with Varying Soak Time FIG. 5 illustrates the results of the $CO_2$ permeability and $CO_2/CH_4$ selectivity tests on the two CMS films pyrolyzed with varying thermal soak times of 2 hours and 8 hours. As FIG. 5 shows, both permeability and selectivity results show that there is very little change in the separation performance for these membranes with various thermal soak times. These results show that total amount of oxygen exposure has very little impact on performance. Additionally, these results show that for temperatures of about 550° C., thermal soak times beyond two hours also have very little impact on performance. Therefore, commercial processes, which are often larger and require longer cool down times than laboratory-scale processes, will not be impacted by small changes in thermal profile.

3. Separation Performance of CMS Membranes Produced from Matrimid® Precursors with Varying Pyrolysis Atmosphere Flow Rate FIG. 6 shows the results of the $CO_2$ permeability and $CO_2/CH_4$ selectivity tests on the two CMS films pyrolyzed with varying pyrolysis atmosphere flow rates of 50 cc (STP)/min and 200 cc (STP)/min at 30 ppm $O_2$/Ar. As FIG. 6 shows, there is little change in gas separation performance based on pyrolysis atmosphere flow rate, even though a greater flow rate means that the total amount of oxygen available was greater. The below table, which provides the results of total $O_2$ availability and total $O_2$ consumption for each of the two flow rates, also shows that flow rate has very little impact on the amount of oxygen consumed during pyrolysis.

| Inert flowrate during pyrolysis (cc (STP)/min) | Total $O_2$ available (cc (STP)/g) | Total $O_2$ consumed (cc (STP)/g) |
|---|---|---|
| 50 | 67.3 | 45.4 |
| 200 | 154.2 | 50.0 |

4. Separation Performance of CMS Membranes Produced from Matrimid® Polymeric Precursors with Varying Precursor Polymer Thickness FIG. 7 illustrates the results of the $CO_2$ permeability and $CO_2/CH_4$ selectivity tests on the two CMS films having varying thicknesses of 4 mil and 2 mil. As FIG. 7 shows, both permeability and selectivity results show that there is very little change in the separation performance for these membranes with different thicknesses. These results show that the oxygen reaction in the pores of the carbon molecular sieve is not limited by internal mass transfer. In addition, these results indicate that the membranes are symmetric, and that oxygen incorporation on the membranes is uniform throughout. This shows that the present technology is not limited to any particular membrane geometry or dimensions.

The comparative tests using varying thermal soak rate, varying atmosphere flow rate, and varying membrane thickness indicate that the transport mechanism is most likely limited by chemical reaction, which is controlled by oxygen concentration. It is believed, therefore, that only concentration and temperature are important in the equilibrium-controlled case.

We claim:

1. A process of separating acid gas components from a natural gas stream comprising:
   providing an asymmetric carbon molecular sieve hollow fiber module comprising a sealable enclosure, said enclosure having
   a plurality of membranes contained therein, at least one of said membranes produced according to the process comprising the steps of
   a. providing an asymmetric hollow polymer fiber precursor
   b. heating said precursor in a chamber to at least a temperature at which pyrolysis byproducts are evolved; and,
   c. flowing an inert gas through said chamber, said inert gas containing less than about 40 ppm of oxygen;
   an inlet for introducing a feed stream comprising natural gas;
   an outlet for permitting egress of a permeate gas stream; and,
   another outlet for permitting egress of a retentate gas stream; and
   introducing said natural gas stream into said module at a pressure of at least about 20 bar.

2. The process of claim 1, wherein said natural gas stream contains at least about 3% by volume of an acid gas component.

3. A process for reducing the concentration of acid gases in a natural gas stream comprising:
   (a) providing a carbon membrane produced by a process including the steps of:
   i. providing a membrane formed of asymmetric hollow polymer fibers;
   ii. heating said membrane in a chamber to at least a temperature at which pyrolysis byproducts are evolved; and,
   iii. flowing an inert gas through said chamber, said inert gas containing less than about 40 ppm of oxygen,
   (b) flowing said natural gas stream through said membrane to produce a retentate stream having a reduced concentration of acid gases.

4. The process of claim 3, wherein said inert gas contains less than about 10 ppm of oxygen.

5. A process for optimizing the $CO_2/CH_4$ selectivity of a carbon membrane comprising forming said carbon membrane by:
   a. providing a polymer precursor in the form of asymmetric hollow polymer fibers;
   b. heating said precursor in a chamber to at least a temperature at which pyrolysis byproducts are evolved; and,
   c. flowing an inert gas through said chamber, said inert gas containing less than about 10 ppm of oxygen.

6. The process of claim 5, wherein said precursor is in the form of an asymmetric hollow polymer fiber.

7. A carbon membrane produced by the process of claim 5.

8. A process for making a carbon membrane having a predetermined degree of $CO_2$ permeability comprising:
   a. providing a polymer precursor
   b. heating said precursor in a chamber to at least a temperature at which pyrolysis byproducts are evolved; and,
   c. flowing a gas through said chamber, the concentration of oxygen in said gas being selected to produce a carbon membrane having said predetermined degree of $CO_2$ permeability.

9. The process of claim 8, said oxygen concentration being selected to increase the permeability of said carbon membrane.

10. The process of claim 8, wherein said oxygen concentration is maintained between 1 ppm and 30 ppm.

11. The process of claim 8 wherein the heating temperature is also selected to provide a predetermined degree of $CO_2$ permeability.

12. The process of claim 11 wherein the heating temperature is between 450° C. and 600° C.

13. The process of claim 11 wherein the heating temperature is between 600° C. and 1000° C.

14. A process according to claim 8, further comprising
   a. providing a second polymer precursor
   b. heating said second polymer precursor in a chamber to at least a temperature at which pyrolysis byproducts are evolved; and,
   c. flowing a gas through said chamber, the concentration of oxygen in said gas being selected to produce a second carbon membrane having a predetermined degree of $CO_2$ permeability;
   whereby a first carbon membrane having a first predetermined degree of $CO_2$ permeability is produced and a second carbon membrane having a second predetermined degree of $CO_2$ permeability is produced, said first and second predetermined degrees of $CO_2$ permeability differing by at least about 10 Barrer.

15. A process for making a carbon membrane having a predetermined degree of $CO_2/CH_4$ selectivity comprising:
   a. providing a polymer precursor
   b. heating said precursor in a chamber to at least a temperature at which pyrolysis byproducts are evolved; and,
   c. flowing a gas through said chamber, the concentration of oxygen in said gas being selected to produce a carbon membrane having said predetermined degree of $CO_2/CH_4$ selectivity.

16. The process of claim 15, said oxygen concentration being selected to increase the $CO_2/CH_4$ selectivity of said carbon membrane.

17. The process of claim 15, wherein said oxygen concentration is maintained between 1 ppm and 30 ppm.

18. The process of claim 15, wherein said oxygen concentration is maintained at between 30 ppm and 50 ppm.

19. The process of claim 15 wherein the heating temperature is also selected to provide a predetermined degree of $CO_2/CH_4$ selectivity.

20. The process of claim 19 wherein the heating temperature is between 450° C. and 600° C.

21. The process of claim 19 wherein the heating temperature is between 600° C. and 1000° C.

22. A process according to claim 15, further comprising
   a. providing a second polymer precursor
   b. heating said second polymer precursor in a chamber to at least a temperature at which pyrolysis byproducts are evolved; and,
   c. flowing a gas through said chamber, the concentration of oxygen in said gas being selected to produce a second carbon membrane having a predetermined degree of $CO_2/CH_4$ selectivity;
   whereby a first carbon membrane having a first predetermined degree of $CO_2/CH_4$ selectivity is produced and a second carbon membrane having a second predetermined degree of $CO_2/CH_4$ selectivity is produced, said first and second predetermined degrees of $CO_2/CH_4$ selectivity differing by at least about 10.

23. A gas separation apparatus, comprising one carbon membrane module produced by pyrolyzing a polymer precursor in an atmosphere having a first oxygen concentration, and another carbon membrane module produced by pyrolyzing a polymer precursor in an atmosphere having a second oxygen concentration, said first and second oxygen concentrations differing by at least 2 ppm oxygen to inert gas.

24. The apparatus of claim 23, wherein said first and second oxygen concentrations differ by at least 10 ppm oxygen to inert gas.

25. The apparatus of claim 23, comprising one carbon membrane having a first $CO_2$ permeability, and another carbon membrane having a second $CO_2$ permeability, said first and second $CO_2$ permeabilities differing by at least about 10 Barrer.

26. The apparatus of claim 23 comprising one carbon membrane having a first $CO_2/CH_4$ selectivity, and another carbon membrane having a second $CO_2/CH_4$ selectivity, said first and second first $CO_2/CH_4$ selectivities differing by at least about 10.

27. A process for making at least two carbon membranes having different predetermined degrees of $CO_2$ permeability comprising the steps of:
   a. providing a first polymer precursor;
   b. heating said first precursor in a first chamber to at least a temperature at which pyrolysis byproducts are evolved;
   c. flowing a first gas through said first chamber during said first heating step, the concentration of oxygen in said first gas being selected to produce a first carbon membrane having a first predetermined degree of $CO_2$ permeability;
   d. providing a second polymer precursor;
   e. heating said second precursor in a second chamber to at least a temperature at which pyrolysis byproducts are evolved; and
   f. flowing a second gas through said second chamber during said second heating step, the concentration of oxygen in said second gas being selected to produce a second carbon membrane having a second predetermined degree of $CO_2$ permeability,
   wherein the concentration of oxygen in said first gas and said second gas differ by at least 2 ppm.

28. The first and second carbon membranes made by the process of claim 27.

29. A process for making at least two carbon membranes having different predetermined degrees of $CO_2/CH_4$ selectivity comprising the steps of:

a. providing a first polymer precursor;
b. heating said first precursor in a first chamber to at least a temperature at which pyrolysis byproducts are evolved;
c. flowing a first gas through said first chamber during said first heating step, the concentration of oxygen in said first gas being selected to produce a first carbon membrane having a first predetermined degree of $CO_2/CH_4$ selectivity;
d. providing a second polymer precursor;
e. heating said second precursor in a second chamber to at least a temperature at which pyrolysis byproducts are evolved; and
f. flowing a second gas through said second chamber during said second heating step, the concentration of oxygen in said second gas being selected to produce a second carbon membrane having a second predetermined degree of $CO_2/CH_4$ selectivity,
wherein the concentration of oxygen in said first gas and said second gas differ by at least 2 ppm.

30. The first and second carbon membranes made by the process of claim 29.

31. An asymmetric carbon molecular sieve hollow fiber module comprising
   a sealable enclosure, said enclosure having;
   a plurality of membranes contained therein, at least one of said membranes produced according to the process of claim 8;
   an inlet for introducing a feed stream comprising natural gas;
   an outlet for permitting egress of a permeate gas stream; and,
   another outlet for permitting egress of a retentate gas stream.

32. An asymmetric carbon molecular sieve hollow fiber module comprising
   a sealable enclosure, said enclosure having;
   a plurality of membranes contained therein, at least one of said membranes produced according to the process of claim 15;
   an inlet for introducing a feed stream comprising natural gas;
   an outlet for permitting egress of a permeate gas stream; and,
   another outlet for permitting egress of a retentate gas stream.

33. The process of claim 8, wherein said oxygen concentration is maintained between 8 ppm and 40 ppm.

34. The process of claim 15, wherein said oxygen concentration is maintained between 8 ppm and 40 ppm.

35. The process of claim 8, wherein said oxygen concentration is maintained between 3 ppm and 100 ppm.

36. The process of claim 15, wherein said oxygen concentration is maintained between 3 ppm and 100 ppm.

* * * * *